United States Patent
Hu et al.

(10) Patent No.: US 12,367,362 B1
(45) Date of Patent: Jul. 22, 2025

(54) MODEL BASED CROSS CHANNEL MISSING JET COMPENSATION

(71) Applicant: Xerox Corporation, Norwalk, CT (US)

(72) Inventors: Sige Hu, Norwalk, CT (US); Stuart A. Schweid, Norwalk, CT (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/415,781

(22) Filed: Jan. 18, 2024

(51) Int. Cl.
  *H04N 1/04* (2006.01)
  *B41J 2/045* (2006.01)
  *B41J 2/21* (2006.01)
  *G06K 15/00* (2006.01)
  *G06K 15/02* (2006.01)

(52) U.S. Cl.
  CPC ........ *G06K 15/1868* (2013.01); *B41J 2/0451* (2013.01); *B41J 2/04586* (2013.01); *B41J 2/21* (2013.01); *G06K 15/1878* (2013.01); *G06K 15/1881* (2013.01); *G06K 15/408* (2013.01); *G06K 2215/101* (2013.01)

(58) Field of Classification Search
  USPC ...................................... 358/1.8, 3.26, 3.06
  See application file for complete search history.

(56) References Cited

U.S. PATENT DOCUMENTS

| | | | |
|---|---|---|---|
| 6,695,435 B1 * | 2/2004 | Cheng | H04N 1/58 347/19 |
| 9,375,964 B2 * | 6/2016 | Koehler | B41J 2/16579 |
| 9,434,176 B1 | 9/2016 | Kroon | |
| 9,561,644 B1 * | 2/2017 | Clark | B41J 2/2146 |
| 9,573,382 B1 | 2/2017 | Metcalfe | |
| 11,673,393 B1 | 6/2023 | Sambhy et al. | |

* cited by examiner

*Primary Examiner* — Cheukfan Lee
(74) *Attorney, Agent, or Firm* — Fox Rothschild LLP

(57) ABSTRACT

A method for forming an image by a print device includes: identifying a first pixel in halftone image data, the halftone image data representing an image to be formed, the first pixel corresponding to a malfunctioning inkjet of a plurality of inkjets. The method further includes identifying a neighboring pixel within a region of the image around the first pixel, the neighboring pixel corresponding to a functioning inkjet. The method further includes generating a modified halftone value for the neighboring pixel by: identifying a missing color associated with the malfunctioning inkjet, identifying a replacement color to compensate the missing color (the replacement color being a different color than the missing color), and modifying a halftone value for the neighboring pixel based on the replacement color. The method further includes causing the functioning inkjet to eject an ink drop based on the modified halftone value for the neighboring pixel.

20 Claims, 6 Drawing Sheets

MODEL BASED CROSS CHANNEL MISSING JET COMPENSATION

BACKGROUND

Inkjet technology for producing printed media has been employed in commercial products such as printers, plotters, and facsimile machines. Generally, an inkjet image is formed by selectively ejecting ink drops from multiple inkjets, which are arranged in one or more printheads, onto an image receiving surface. During printing, the printheads and/or the image-receiving surface move relative to another, and the inkjets eject ink drops at appropriate times to form an ink image on the image-receiving surface. A processor in the printer generates electrical signals, also known as firing signals, at predetermined times to activate individual inkjets in the printer. The ink ejected from the inkjets can be liquid ink, such as aqueous, solvent, oil based, ultraviolet (UV) curable ink, or the like, which is stored in containers installed in the printer.

During operation, some inkjets in one or more printheads may fail to operate due to contaminants that clog nozzles or due to other defect or malfunction in a printhead. As used herein, the term "malfunctioning inkjet" refers to an inkjet that fails to properly eject ink drops onto the predetermined locations of an image-receiving surface in a reliable manner during a printing operation. Malfunctioning inkjets may fail to eject ink drops entirely, eject drops only intermittently, or eject drops onto incorrect locations on the image-receiving surface.

Existing compensation methods for malfunctioning inkjets identify pixel locations in binary halftoned image data that correspond to inoperable inkjets and redistribute the "orphan" pixels from the inoperable inkjet to neighboring inkjets to reduce the perceptible impact of the missing color due to the inoperable inkjet. However, this method only works well when the neighbors are not already assigned to firing jobs. Consequently, improved systems and methods for malfunctioning inkjet compensation methods would be beneficial.

SUMMARY

This disclosure generally relates to compensating for malfunctioning inkjets. In an embodiment, a method is disclosed. The method includes: identifying a first pixel in halftone image data, the halftone image data representing an image to be formed, the first pixel corresponding to a malfunctioning inkjet of multiple inkjets. The method further includes identifying a neighboring pixel within a region of the image around the first pixel, the neighboring pixel corresponding to a functioning inkjet. The method further includes generating a modified halftone value for the neighboring pixel by: identifying a missing color associated with the malfunctioning inkjet, identifying a replacement color to compensate the missing color (the replacement color being a different color than the missing color), and modifying a halftone value for the neighboring pixel based on the replacement color. The method further includes causing the functioning inkjet to eject an ink drop based on the modified halftone value for the neighboring pixel.

Implementations of the disclosure may include one or more of the following optional features. In some examples, modifying the halftone value for the neighboring pixel based on the replacement color includes determining an adjustment to the replacement color associated with the neighboring pixel based on the malfunctioning inkjet not printing the missing color of the first pixel and modifying the halftone value for the neighboring pixel to include the adjustment to the replacement color. In some examples, determining the adjustment to the replacement color associated with the neighboring pixel includes determining a change in a print characteristic associated with not printing the missing color of the first pixel and determining the adjustment to the replacement color associated with the neighboring pixel based on the determined change in the print characteristic associated with not printing the missing color. Determining the change in the print characteristic may include determining a change in reflectance associated with not printing the missing color of the first pixel. Determining the change in the print characteristic may include determining the change in the print characteristic associated with not printing the missing color of multiple pixels. Determining the adjustment to the replacement color may include determining the adjustment based on a distance from the first pixel to the neighboring pixel. Determining the adjustment to the replacement color may include determining the adjustment based on a dot gain effect of the neighboring pixel. Determining the adjustment to the replacement color of the neighboring pixel may include applying a localized differential Yule-Nielson model to characteristics of the first pixel and the neighboring pixel. Determining the adjustment to the replacement color of the neighboring pixel may include determining adjustments to replacement colors of each of multiple neighboring pixels. The malfunctioning inkjet may be adjacent the functioning inkjet. The missing color may be magenta and the replacement color may be cyan.

In an embodiment, an image-forming system is disclosed. The image-forming system includes multiple ink jets configured to eject drops of ink onto a substrate, a processor, and programming instructions. The programming instructions are configured to, when executed, cause the processor to identify a first pixel in halftone image data, the halftone image data representing an image to be formed, the first pixel corresponding to a malfunctioning inkjet of multiple inkjets. The programming instructions are further configured to cause the processor to identify, within a region of the image around the first pixel, a neighboring pixel, the neighboring pixel corresponding to a functioning inkjet. The programming instructions are further configured to cause the processor to generating a modified halftone value for the neighboring pixel by: identifying a missing color associated with the malfunctioning inkjet, identifying a replacement color to compensate the missing color, the replacement color being a different color than the missing color, and modifying a halftone value for the neighboring pixel based on the replacement color. The programming instructions are further configured to cause the processor to cause the functioning inkjet to eject an ink drop based on the modified halftone value for the neighboring pixel.

Implementations of the disclosure may include one or more of the following optional features. In some examples, the programming instructions that are configured to cause the processor to modify the halftone value for the neighboring pixel based on the replacement color include programming instructions that are configured to cause the processor to determine an adjustment to the replacement color associated with the neighboring pixel based on the malfunctioning inkjet not printing the missing color of the first pixel and modify the halftone value for the neighboring pixel to include the adjustment to the replacement color. The programming instructions that are configured to cause the processor to determine the adjustment to the replacement color associated with the neighboring pixel may include programming instructions that are configured to cause the processor to determine a change in a print characteristic associated with not printing the missing color of the first pixel and determine the adjustment to the replacement color associated with the neighboring pixel based on the determined change in the print characteristic associated with not printing the missing color. The programming instructions that are configured to cause the processor to determine the change in the print characteristic may include programming instructions that are configured to cause the processor to determine a change in reflectance associated with not printing the missing color of the first pixel. The programming instructions that are configured to cause the processor to determine the change in the print characteristic may include programming instructions that are configured to cause the processor to determine the change in the print characteristic associated with not printing the missing color of multiple pixels. The programming instructions that are configured to cause the processor to determine the adjustment to the replacement color may include programming instructions that are configured to cause the processor to determine the adjustment based on a distance from the first pixel to the neighboring pixel. In some examples, the programming instructions that are configured to cause the processor to determine the adjustment to the replacement color include programming instructions that are configured to cause the processor to determine the adjustment based on a dot gain effect of the neighboring pixel. The programming instructions that are configured to cause the processor to determine the adjustment to the replacement color of the neighboring pixel may include programming instructions that are configured to cause the processor to apply a localized differential Yule-Nielson model to characteristics of the first pixel and the neighboring pixel. In some examples, the programming instructions that are configured to cause the processor to determine the adjustment to the replacement color of the neighboring pixel include programming instructions that are configured to cause the processor to determine adjustments to replacement colors of each multiple neighboring pixels.

BRIEF DESCRIPTION OF THE DRAWINGS

The present solution will be described with reference to the following drawing figures, in which like numerals represent like items throughout the figures.

DETAILED DESCRIPTION

Figure 1A:
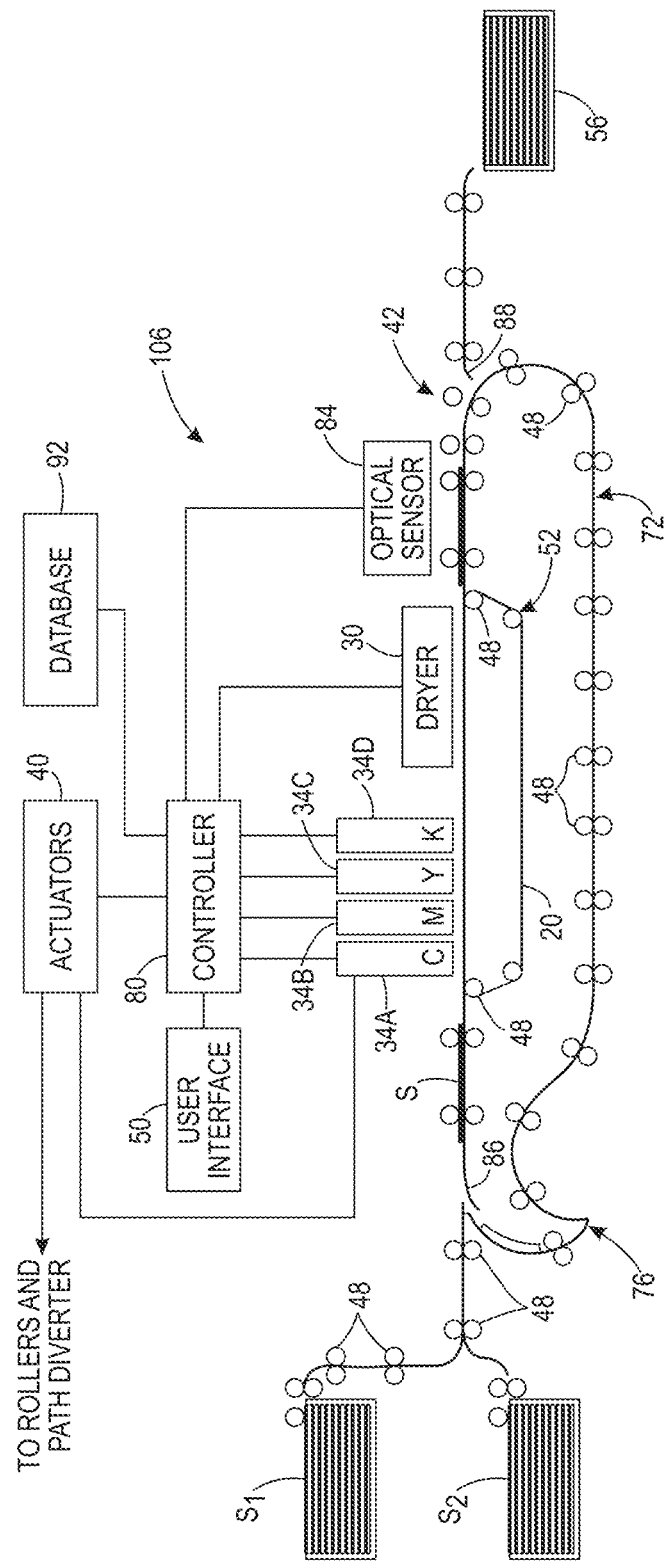
FIGS. 1A and 1B provides an illustration of an example system.

When used in this document, terms such as "top" and "bottom," "upper" and "lower," "inboard" and "outboard," or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

Additional terms that are relevant to this disclosure will be defined at the end of this Detailed Description section.

The following disclosure is generally directed to cross-channel compensation for a malfunctioning inkjet. That is, methods and systems are disclosed which relate to compensating for a malfunctioning inkjet using one or more neighboring inkjets. In particular, the disclosed methods compensate for a color that is missing due to the malfunctioning inkjet using a different color from the neighboring inkjets(s). In many cases, a different color is more likely to be available for compensation than the missing color, at least because adjacent pixels are more likely to have similar colors. Human eyes are more sensitive to intensity/luminance changes than to color/chrominance changes. The disclosed systems and methods compensate for the expected change in reflectance due to the malfunctioning inkjet by using a different color combined with an understanding of several factors that affect perceived characteristics such as reflectance. In particular, a localized differential model is used to estimate the level of cross-channel compensation to apply. The model may be used in real time, e.g., in a print device while rendering an image, or may be used offline to generate output, such as lookup tables. In these and other cases, the model or the generated output allow the print device to compensate for malfunctioning inkjets while rendering images on substrates.

The term "print device" refers to a machine having hardware capable of reading digital data and using the information from the data and associated print instructions to form an image on a physical substrate. In some embodiments, a print device may have additional capabilities such as scanning or faxing and thus may be a multifunction device. Example print devices include traditional printers and multi-function devices, as well as specialized print devices such as ticket printers, sales receipt printers, and the like. Components of a print device typically include a print engine, which includes print hardware such as a print head, which may include components such as a print cartridge containing ink, toner or another print material, as well as a document feeding system configured to pass a substrate through the print device so that the print head can print characters and/or images on the substrate. In embodiments that print a 3D object, the print device may be a 3D printer that can use a digital model to successively place layers of build material on a substrate in a configuration that results in a 3D object. The word "printer" as used in this document refers encompasses any apparatus, such as a digital copier, bookmaking machine, facsimile machine, multi-function machine and the like, which performs a print outputting function for any purpose.

FIG. 1A depicts a prior art high-speed color inkjet printer 106 that does not provide missing-jet compensation. As illustrated, the printer 106 directly forms an ink image on a surface of a media sheet stripped from one of the supplies of media sheets Si or Sz and the sheets S are moved through the printer 106 by the controller 80 operating one or more of the actuators 40 that are operatively connected to rollers or to at least one driving roller of conveyor 52 that comprise a portion of the media transport 42 that passes through the Print Zone (PZ) (shown in FIG. 1B) of the printer. In one embodiment, each printhead module has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads that enables media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 106 is depicted with only two supplies of media sheets, the printer can be configured with three or more sheet supplies, each containing a different type or size of media.

Figure 1B:
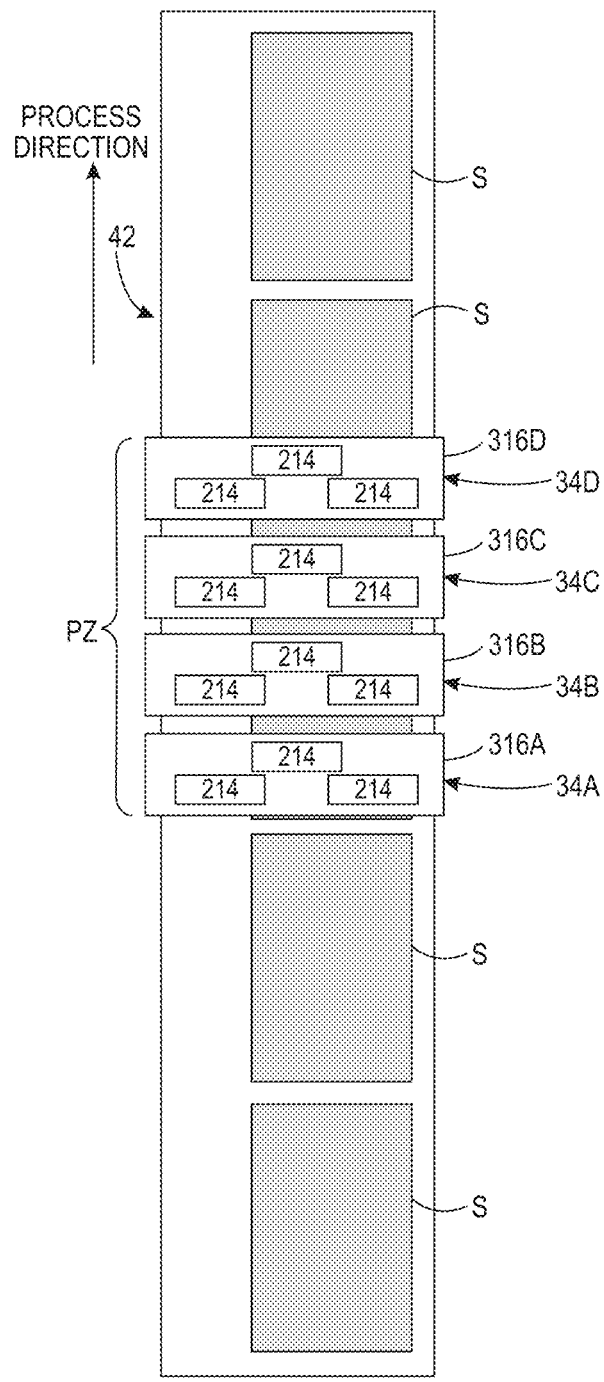

The print zone (PZ) in the prior art printer 106 of FIG. 1A is shown in FIG. 1B. The print zone PZ has a length in the process direction commensurate with the distance from the first inkjets that a sheet passes in the process direction to the last inkjets that a sheet passes in the process direction and it has a width that is the maximum distance between the most outboard inkjets on opposite sides of the print zone that are directly across from one another in the cross-process direction. Each printhead module 34A, 34B, 34C, and 34D shown in FIG. 1B has three printheads 214 mounted to one of the printhead carrier plates 316A, 316B, 316C, and 316D, respectively.

As shown in FIG. 1A, the printed image passes under an image dryer 30 after the ink image is printed on a sheet S. The image dryer 30 can include an infrared heater, a heated air blower, air returns, or combinations of these components to heat the ink image and at least partially fix an image to the web. An infrared heater applies infrared heat to the printed image on the surface of the web to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

Figure 3:
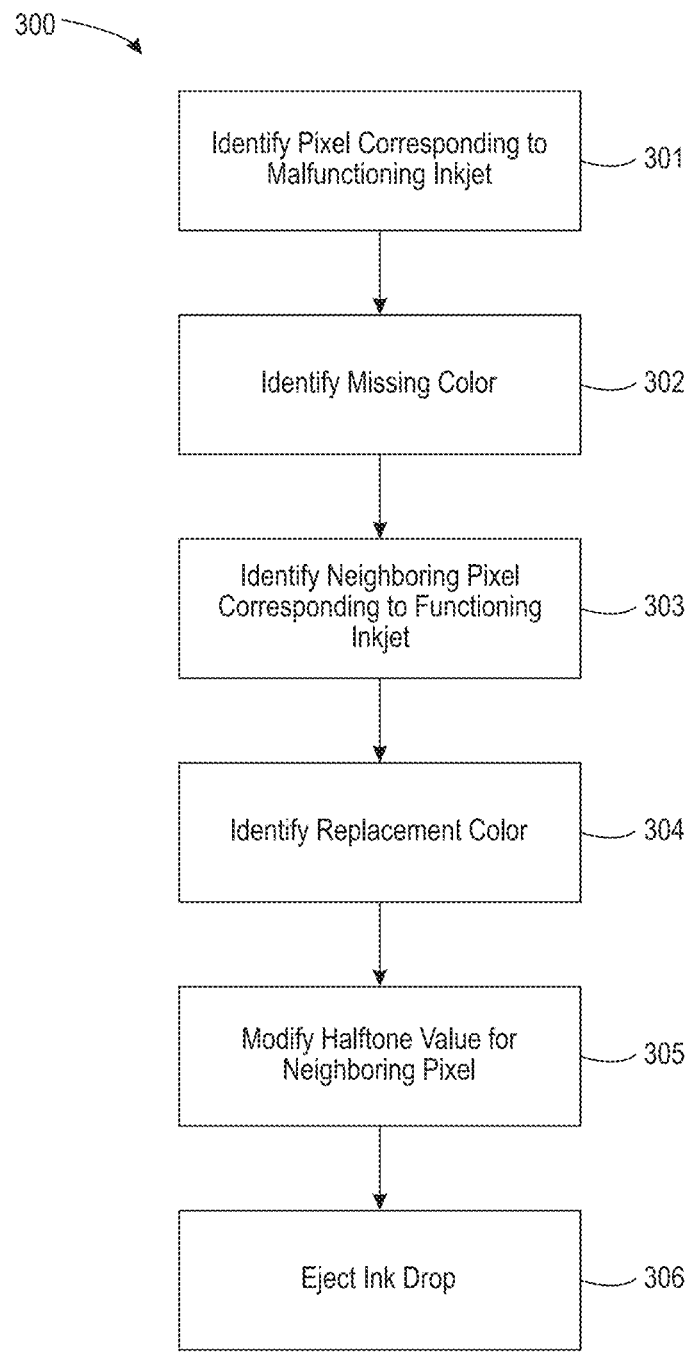
FIG. 3 shows a flowchart for an example method.

A duplex path 72 is provided to receive a sheet from the transport system 42 after a substrate has been printed and move it by the rotation of rollers in an opposite direction to the direction of movement past the printheads. At position 76 in the duplex path 72, the substrate can be turned over so it can merge into the job stream being carried by the media transport system 42. The controller 80 is configured to flip the sheet selectively. That is, the controller 80 can operate actuators to turn the sheet over so the reverse side of the sheet can be printed or it can operate actuators so the sheet is returned to the transport path without turning over the sheet so the printed side of the sheet can be printed again. Movement of pivoting member 88 provides access to the duplex path 72. Rotation of pivoting member 88 is controlled by controller 80 selectively operating an actuator 40 operatively connected to the pivoting member 88. When pivoting member 88 is rotated counterclockwise as shown in FIG. 3, a substrate from media transport 42 is diverted to the duplex path 72. Rotating the pivoting member 88 in the clockwise direction from the diverting position closes access to the duplex path 72 so substrates on the media transport move to the receptacle 56. Another pivoting member 86 is positioned between position 76 in the duplex path 72 and the media transport 42. When controller 80 operates an actuator to rotate pivoting member 86 in the counterclockwise direction, a substrate from the duplex path 72 merges into the job stream on media transport 42. Rotating the pivoting member 86 in the clockwise direction closes the duplex path access to the media transport 42.

As further shown in FIG. 1A, the printed media sheets S not diverted to the duplex path 72 are carried by the media transport to the sheet receptacle 56 in which they are be collected. Before the printed sheets reach the receptacle 56, they pass by an optical sensor 84. The optical sensor 84 generates image data of the printed sheets and this image data is analyzed by the controller 80. The controller 80 is configured to detect streakiness in the printed images on the media sheets of a print job. Additionally, sheets that are printed with test pattern images are inserted at intervals during the print job. These test pattern images are analyzed by the controller 80 to determine which inkjets, if any, that were operated to eject ink into the test pattern did in fact do so, and if an inkjet did eject an ink drop whether the drop landed at its intended position with an appropriate mass. Any inkjet not ejecting an ink drop it was supposed to eject or ejecting a drop not having the right mass or landing at an errant position is called an malfunctioning inkjet in this document. The controller 80 can store data identifying the malfunctioning inkjets in database 92 operatively connected to the controller 80. These sheets printed with the test patterns are sometimes called run-time missing inkjet (RTMJ) sheets and these sheets are discarded from the output of the print job. A user can operate the user interface 50 to obtain reports displayed on the interface that identify the number of malfunctioning inkjets and the printheads in which the malfunctioning inkjets are located. The optical sensor can be a digital camera, an array of LEDs and photodetectors, or other devices configured to generate image data of a passing surface. As already noted, the media transport also includes a duplex path that can turn a sheet over and return it to the transport prior to the printhead modules so the opposite side of the sheet can be printed. While FIG. 1A shows the printed sheets as being collected in the sheet receptacle, they can be directed to other processing stations (not shown) that perform tasks such as folding, collating, binding, and stapling of the media sheets.

Operation and control of the various subsystems, components and functions of the machine or print device 106 are performed with the aid of a controller or electronic subsystem (ESS) 80. The ESS or controller 80 is operatively connected to the components of the printhead modules 34A-34D (and thus the printheads), the actuators 40, and the dryer 30. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, image content data for an image to be produced are sent to the controller 80 from either a scanning system or an online or work station connection for processing and generation of the printhead control signals output to the printhead modules 34A-34D. Along with the image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job and the term "image content data" means digital data that identifies an ink image to be printed on a media sheet.

In some examples, the image to be formed is defined by an image file which is interpreted by the print device 106. Example digital image file formats include JPEG, GIF, PostScript, PDF, Raster Document Object (RDO), Gerber files, and so forth. The image file may be a digital file stored on a file server 102 in communication with the print device 106, e.g., using a communication network 104. The print device 106 may receive the image file (from the file server or other means), interpret the contents of the file, and form the image on the substrate based on the interpreted contents. In particular, the print device 106 may propel droplets of colored ink onto substrates of paper, plastic, or other material. Such print devices 106 are often referred to as inkjet printers, and the mechanism that propels the ink drop is often referred to as an inkjet. The mechanism may use piezoelectric drop-on-demand, thermal inkjets, or other mechanism to propel a drop of ink. The print device 106 may include one or more inkjets. The inkjets may be organized into a printhead. For example, a printhead may be configured with three or four inkjets, so that the printhead can provide the gamut of colors within a color system, such as CMY(K). "Gamut" refers to a subset of colors which can be accurately represented in a particular medium. In some examples, at least one inkjet is fixed in place with respect to the print device 106. In this case, the substrate moves with respect to the fixed inkjet in at least one dimension. In some cases, fixed inkjets are configured to propel ink onto a particular column (or row) of the substrate as the substrate passes the inkjets.

The print device 106 may include an embedded processor 80 configured to interpret the image file and control the inkjets (e.g., control the firing of the inkjets) to form the image as the substrate moves past the printheads. The methods disclosed in this document are directed to compensating for fully or partially malfunctioning inkjets. To implement the method in the print device 106, the processor may be configured by storing programmed instructions in a memory operatively connected to the processor. As the processor executes the instructions, contone values for an image are received and malfunctioning inkjets are identified. The contone values are processed by the processor to identify the contone values for the color space components for a compensation level for each malfunctioning inkjet and the contone values of the compensation levels are used to produce modified contone values for the output image. In some examples, some steps of the method may be implemented in a server such as file server 102. In that case, data identifying malfunctioning inkjets is received by the server 102, which modifies the image file according to the disclosed method before transmitting the modified image file to the print device 106. In either case, the print device 106 performs halftoning based on the modified contone values.

A standard CMYK color printer uses four colors: cyan, magenta, yellow and black. Of these colors, cyan and magenta have the most similar intensity/reflectance properties. Therefore, these colors may be generally the most suitable for compensating each other. For that reason, the example methods and systems in this document disclose compensating for missing cyan using magenta. It should be appreciated that the methods and systems apply equally to compensating for missing magenta using cyan. Furthermore, there are circumstances where the disclosed systems and methods may effectively compensate for missing cyan or magenta using black and compensating black using a combination of cyan and magenta. It should also be appreciated that the disclosed systems and methods are suitable for color schemes other than CMYK.

In some embodiments, the compensation is applied at the contone level after applying any Tone Reproduction Curve (TRC) adjustment to the image. The compensation is based on a compensation estimation model which estimates the level of cross-channel compensation when missing jets are compensated by another color. The compensation level is, for a certain value of "commanded area coverage" (also referred to as "gray level") of the missing inkjet color, the amount of ink required to compensate for the missing inkjet by the replacement color. If the compensation level is too low, the white streaks caused by the missing color might still be visible, while over-compensation could create dark streaks in place of the missing color.

The compensation estimation model matches the reflectance change caused by the missing inkjet with a compensating reflectance change provided by the replacement color. The compensating reflectance change may, at least in part, be based on the dot gain of the replacement color. The dot gain may include both the physical dot gain and the optical dot gain. Physical dot gain, also known as growth effect, relates to the growth of the inkjet drop beyond the size of a single pixel. Dot gain is expressed as a numerical value which equals the difference between the desired value and the resulting value. For instance: if a page has a 50% flat tint as a background but after measuring the printed result, this flat tint is now 65%, the dot gain equals 30% (0.65/0.5−1). Of note, the dot gain is not identical for all the colors used in color printing. That is, there are slight differences in dot gain between cyan, magenta, yellow, and black. The Yule-Nielsen modified spectral Neugebauer model is one of the most accurate predictive models for the spectral reflectance of printed halftone colors. The Yule-Nielsen model expresses the spectral reflectance of halftones raised to the power 1/n as a linear combination of the spectral reflectance of the fulltone colors (Neugebauer primaries) also raised to the power 1/n, where n is a tunable real number. The power 1/n transform, characteristic of the Yule-Nielsen transform, empirically models the nonlinear relationship between the spectral reflectance of halftones and fulltones due to the internal propagation of light scattering into the printing support, which induces a color halo around the ink dots, a phenomenon known as "optical dot gain" or "Yule-Nielsen effect." Due to the Yule-Nielsen effect (optical dot gain) the color of the halftone is not simply a linear combination of the colors of the colorants contained in it.

The compensation estimation model takes into account the reflectance value of the replacement color. In the case of cyan/magenta compensation there are four colors involved, white, cyan, magenta, and blue, where blue is the combination of cyan and magenta, and white is the absence of cyan and magenta (i.e., the color of the substrate without ink). Reflectance values for these four colors may be obtained empirically. For example, spectrum data may be obtained for each of the four colors at a variety of gray levels, e.g., 5%, 10%, 20%, 30%, . . . , 100% printed on a particular substrate (e.g., glossy white paper). A separate model may be produced for different substrates and/or different color schemes. In the case of CMYK on white paper, practical considerations may limit the blue color that can be printed over a large area to, e.g., only 60%, rather than 100%. If so, the reflectance value for these higher gray levels of blue may be estimated based on empirical spectrum data for cyan and/or magenta. For example, based at least one test, the spectrum curve for blue was found to be substantially similar to the product of blue's constituent colors (cyan and magenta) raised to the 0.8 power. That is, $\text{spec}_{blue}=(\text{spec}_{cyan}\times\text{spec}_{magenta})^{0.8}$. Therefore, this estimate may be used for blue at gray levels greater than 60%. The spectrum values can then be converted to perceived reflectance (Y) using a color space, such as the CIE XYZ color space, which links distributions of wavelengths in the visible light spectrum and physiologically perceived colors in human vision. The CIE XYZ color space is one example of a model that may be used to convert or translate between perceived and actual colors. Other color spaces may also be used.

As disclosed above, the complete model includes dot gain compensation. However, a simplified model, without dot gain compensation, may also be used. This simplified model assumes that each ink drop occupies exactly one pixel size. This simplified model further assumes that the color of the halftone is a linear combination of the fulltone colors (i.e., colors made by covering the whole surface with one or several inks, also called "colorants" or "Neugebauer primaries"). In the case of cyan/magenta compensation, the Neugebauer reflectance equation would be the sum of the reflectance values for cyan, magenta, blue, and white. In other words, $$R(\lambda) = \sum_{i=1}^{4} \alpha_i * R_i(\lambda),$$

where $\alpha$ indicates the amount of each color per pixel. In the case of a malfunctioning magenta inkjet, this missing magenta would change a magenta dot to white and a blue dot to cyan.

Therefore, the reflectance change due to the malfunctioning inkjet (i.e., the reflectance to be compensated) is the sum of the changes in reflectance due to the change in color. In other words, if all the affected dots were magenta (thus changed to white), and all dots had the same gray level, the amount the total change in reflectance would simply be the number of affected pixels times $(\alpha_{magenta}(Y_W-Y_M))$. If, however, some of the affected dots were blue (thus changed to cyan), their change in reflectance would be $(\alpha_{blue}(Y_{CY}-Y_B))$. Compensating for this change in reflectance using a neighboring cyan inkjet results in changing magenta dots to blue and white dots to cyan. A neighboring inkjet is either immediately adjacent the malfunctioning inkjet or in the area or vicinity around, and reasonably close to, the malfunctioning inkjet, such that the neighboring inkjet is close enough to effectively compensate for the malfunctioning inkjet. In some examples, the pixel(s) associated with the neighboring inkjet may be, two, three, or four pixels away from the pixel(s) associated with the malfunctioning inkjet.

Similar to computing the reflectance change due to the malfunctioning inkjet, the change in reflectance due to cyan compensation is the sum of the changes in reflectance due to these change in color. That is, in the above example, if half of the dots change from white to cyan and the other half change from magenta to blue, and the compensating level of cyan is deyan, the resulting compensating reflectance is $\alpha_{cyan}$ $(0.5*(Y_W-Y_{CY})+0.5*(Y_M-Y_B))$. By setting the compensating reflectance to the reflectance change due to the malfunctioning inkjet, the amount of compensation (e.g., $\alpha_{cyan}$) can be calculated.

To include optical dot gain in the model, the Yule-Nielsen correction can be added to the Neugebauer equation. The Yule-Nielsen model expresses the spectral reflectance of halftones raised to the power $1/Y_n$ as a linear combination of the spectral reflectance of the fulltone colors, where $Y_n$ is the Yule-Nielsen factor, i.e., $$R(\lambda) = \left(\sum_{i=1}^{4} \alpha_i * R_i^{\frac{1}{Y_n}}(\lambda)\right)^{Y_n}.$$

That is, the Neugebauer model is the case where the Yule-Nielsen factor $(Y_n)$ equals 1. In order to achieve a desired reflectance, these equations have to be inverted to produce the actual dot areas or digital values sent to the printer, a nontrivial operation that may have multiple solutions.

The physical dot gain (as opposed to the optical dot gain described above) indicates that the single firing drop is not actually one pixel size. The physical dot gain can be expressed as $\alpha c=1-e^{-\lambda gl^{gl_{exp}}}$ where $\lambda$ is the physical dot gain coefficient, gl represents the gray level, $gl_{exp}$ is a gamma coefficient, and ac is the area coverage from 0 to 1 (0 to 100%). The gamma coefficient corresponds to a relative change in reflectance based on an associated change in commanded coverage (gray level). For example, if the gray level is 1% and the measured reflectance is 4% less than white (the color of the substrate without ink), then the gamma coefficient is about 4 (i.e., 4% divided by 1%). This function has a large gain in low area coverage and decreases on high area coverage. At low coverage, all drops are well separated, which allows for physical dot growth that could affect the reflectance change. In high area coverage, the dots are overlapped with neighboring dots, which constrains physical growth and associated reflectance change. That is, at 100% area coverage, no matter how large the physical dot size, the result would still be 100%, which is the same as one pixel dot size. The model assumes that overlapping dots of the same color have a negligible effect on the reflectance which can be ignored. An estimate of the Yule-Nielsen factor can be made using the equation $$ref_{est} = \left[ac * \min(ref)^{\frac{1}{Y_n}} + (1-ac) * \max(ref)^{\frac{1}{Y_n}}\right]^{Y_n},$$

where min(ref) is the reflectance of white and max(ref) is the reflectance of the missing color at 100%. $Y_n$ is the Yule-Nielsen factor to be determined, and ac is the area coverage as defined above. Using these equations, values for $\lambda$, $gl_{exp}$, and $Y_n$ that best match the empirical reflectance data can be determined. With those values, the physical dot gain can be calculated. In one example, at a gray level of 5%, the magenta physical dot gain was determined to be 4.37, meaning 1 magenta drop size was about 4.37 pixels in size. Similarly, the cyan physical dot gain was determined to be 3.96. That is, each drop edge is roughly $\sqrt{\text{dotgain}}$. Fitting these empirical values to above equation, Yule-Nielsen factors of 1.36 and 1.39 best estimated the reflectance data for magenta and cyan, respectively.

Having determined Yule-Nielsen factors and dot gains, it is possible to match the compensation reflectance to the change in reflectance due to the malfunctioning inkjet. Furthermore, the model can be made locally differential (and even locally linear) as follows. As stated above, the perceived reflectance (Y) is a linear combination of the spectral reflectance of the fulltone colors, modified by the Yule-Nielsen factor ($Y_n$). In other words, $$Y^{\frac{1}{Y_n}} = \left(\alpha_w Y_w^{\frac{1}{Y_n}} + \alpha_b Y_b^{\frac{1}{Y_n}} + \alpha_m Y_m^{\frac{1}{Y_n}} + \alpha_{cy} Y_{cy}^{\frac{1}{Y_n}}\right).$$

From this equation, partial derivatives of Y with respect to $\alpha_W$, $\alpha_W$, $\alpha_W$, and $\alpha_W$ can be calculated. For example, $$\frac{\partial Y}{\partial \alpha_w} = Y_n * Y^{\frac{Y_n-1}{Y_n}} * Y_w^{1/Y_n} \text{ and } \frac{\partial Y}{\partial \alpha_{Cy}} = Y_n * Y^{\frac{Y_n-1}{Y_n}} * Y_{Cy}^{1/Y_n}.$$

Therefore, $$\frac{\partial Y}{\partial \alpha_w} - \frac{\partial Y}{\partial \alpha_{Cy}} = Y_n * Y^{\frac{Y_n-1}{Y_n}} * \left(Y_w^{1/Y_n} - Y_{Cy}^{1/Y_n}\right) \text{ and } \frac{\partial Y}{\partial \alpha_M} - \frac{\partial Y}{\partial \alpha_B} =$$

$$Y_n * Y^{\frac{Y_n-1}{Y_n}} * \left(Y_M^{1/Y_n} - Y_B^{1/Y_n}\right).$$

This model can be tested empirically. For example, a test image may include an array (rows and columns) of test "patches" of the color to be compensated (e.g., magenta). Each patch may be, e.g., 2400 by 2400 pixels. To simulate a malfunctioning inkjet, each test patch may include one or more rows (or columns) of dots that omits the color and, therefore, is left the color of the substrate (e.g., white). Each row of patches may correspond to representative gray levels of the color to be compensated (e.g., magenta), for example, 80%, 84%, 88%, . . . , 100% from top to bottom. Each column of patches may correspond to a particular level of compensation. For example, a first column may have no compensation, for reference. A second column may include self-compensation (adding extra magenta ink at neighboring pixels), also for reference. The remaining columns may include increasing levels of cross-compensation applied to pixels that neighbor the simulated malfunctioning inkjet. For example, compensation levels may include 1%, 1.5%, 2%, . . . , 4% from left to right. By inspection, a reasonable compensation level corresponding to each gray level can be selected. These values can be compared against values computed using the model to validate the model.

In one empirical test, every 100 rows of dots included two adjacent simulated malfunctioning inkjets, i.e., dot rows 100 and 101, 200 and 201, etc. Cyan compensation was applied to a total of four neighboring pixels, including the dot rows having simulated malfunctioning inkjet and an additional compensating pixel on each side, i.e., row 99, 100, 101, and 102 for missing rows 100 and 101. As disclosed above, each magenta drop edge was determined to be roughly $\sqrt{4.37}$. Therefore, the change in reflectance due to the simulated malfunctioning magenta inkjet in the patch is not the full two rows. Because magenta drops will expand roughly $$\left(\frac{\sqrt{4.37} - 1}{2}\right)$$

pixels into the white (open) area (from either side), the actual width of the white area caused by the simulated malfunctioning magenta inkjet is roughly $2-(\sqrt{4.37}-1)$, or slightly less than one pixel. In this case, the cyan compensation in the first and fourth dot rows (i.e., the rows adjacent to the simulated malfunctioning magenta inkjet, such as 99 and 102), will coincide with magenta drops, thus changing the magenta to blue. The cyan compensation in the second and third rows part of the drop will change the white pixel to cyan and the other part will change the magenta pixel to blue because of the physical dot gain. The proportion of the cyan drop located the white space depends on the dot gain, which is shown on the following equation:

$$\text{White proportion} = \begin{cases} \dfrac{2 - (\sqrt{\text{dot gain}} - 1)}{\sqrt{\text{dot gain}}}, \text{ dot gain} > 4 \\ \dfrac{1}{\sqrt{\text{dot gain}}}, \text{ dot gain} \le 4 \end{cases}$$

In this empirical test, the total change in reflectance is simply be the number of affected pixels times ($\alpha_{magenta}(Y_W - Y_M)$). The cyan compensation level can be calculated by matching this amount with the following equation:

$$\alpha_{cy} \times \text{dot gain} \times \left[\frac{1}{2} * \left(\text{White proportion} * Y_n * Y^{\frac{Y_n-1}{Y_n}} * \left(Y_w^{1/Y_n} - Y_{Cy}^{1/Y_n}\right) + \right.\right.$$

$$(1 - \text{White proportion}) * Y_n * Y_{ref}^{\frac{Y_n-1}{Y_n}} * \left(Y_M^{1/Y_n} - Y_B^{1/Y_n}\right)\right) +$$

$$\left.\frac{1}{2} * Y_n * Y_{ref}^{\frac{Y_n-1}{Y_n}} * \left(Y_M^{1/Y_n} - Y_B^{1/Y_n}\right)\right]^n \times 4 \times N_{block},$$

where $N_{block}$ is the number of four-row compensation blocks in the entire patch, i.e. the width of the patch in pixels. The resulting $\alpha_{cy}$ compared favorably against compensation values determined by inspecting the test image. The model proved effective over a wide range of gray levels, thus validating the model. Further empirical testing using complex images (rather than patches of single colors) and simulated malfunctioning inkjets also proved reasonable. Thus, by identifying one or more malfunctioning inkjets, and with an understanding of the perceived characteristics of the missing color, a candidate replacement color, and combination thereof, a locally linear model can be developed that effectively compensates for reflectance (or other perceived characteristic).

Figure 2A:
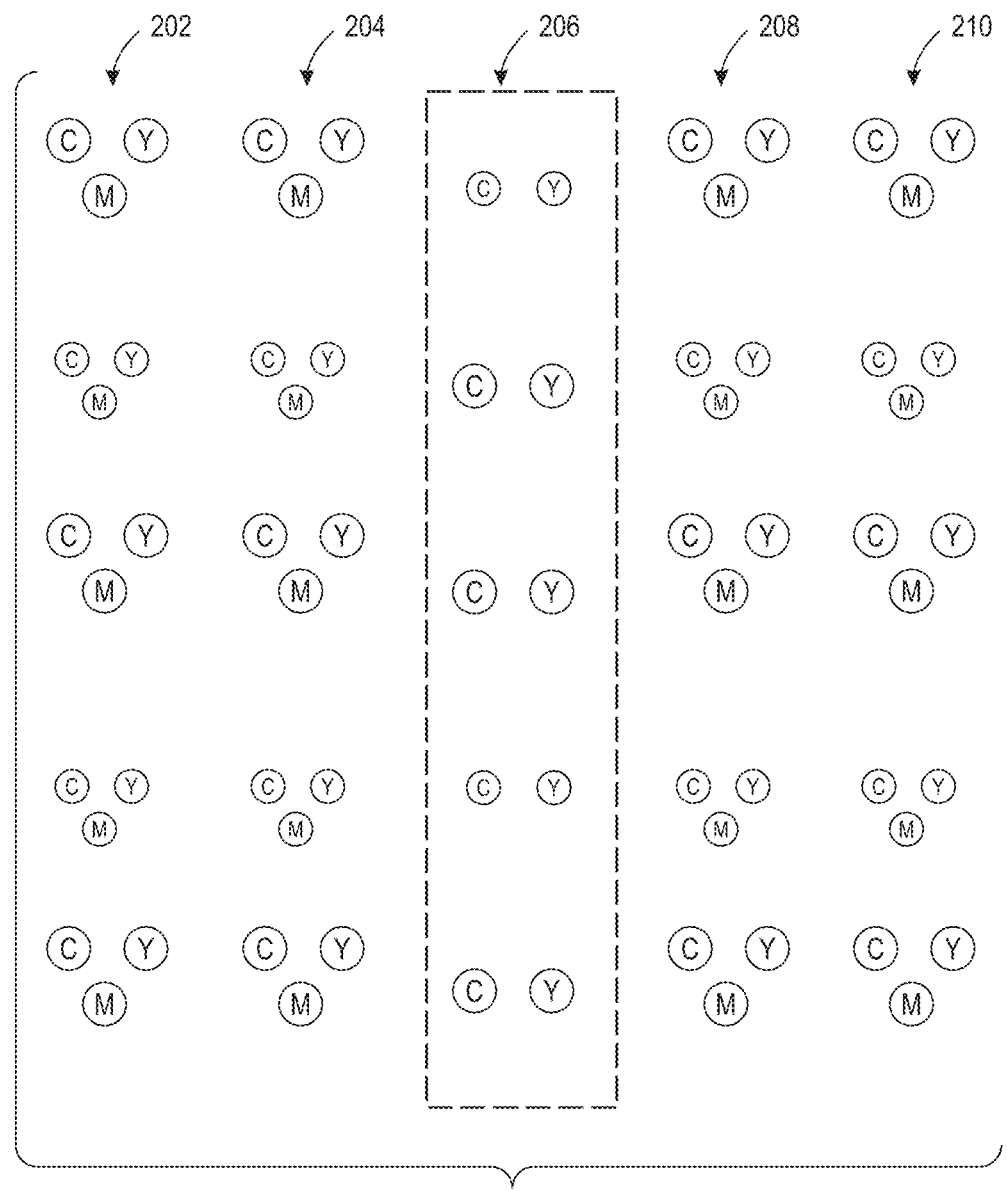
FIGS. 2A and 2B show example ink dot patterns.
Figure 2B:
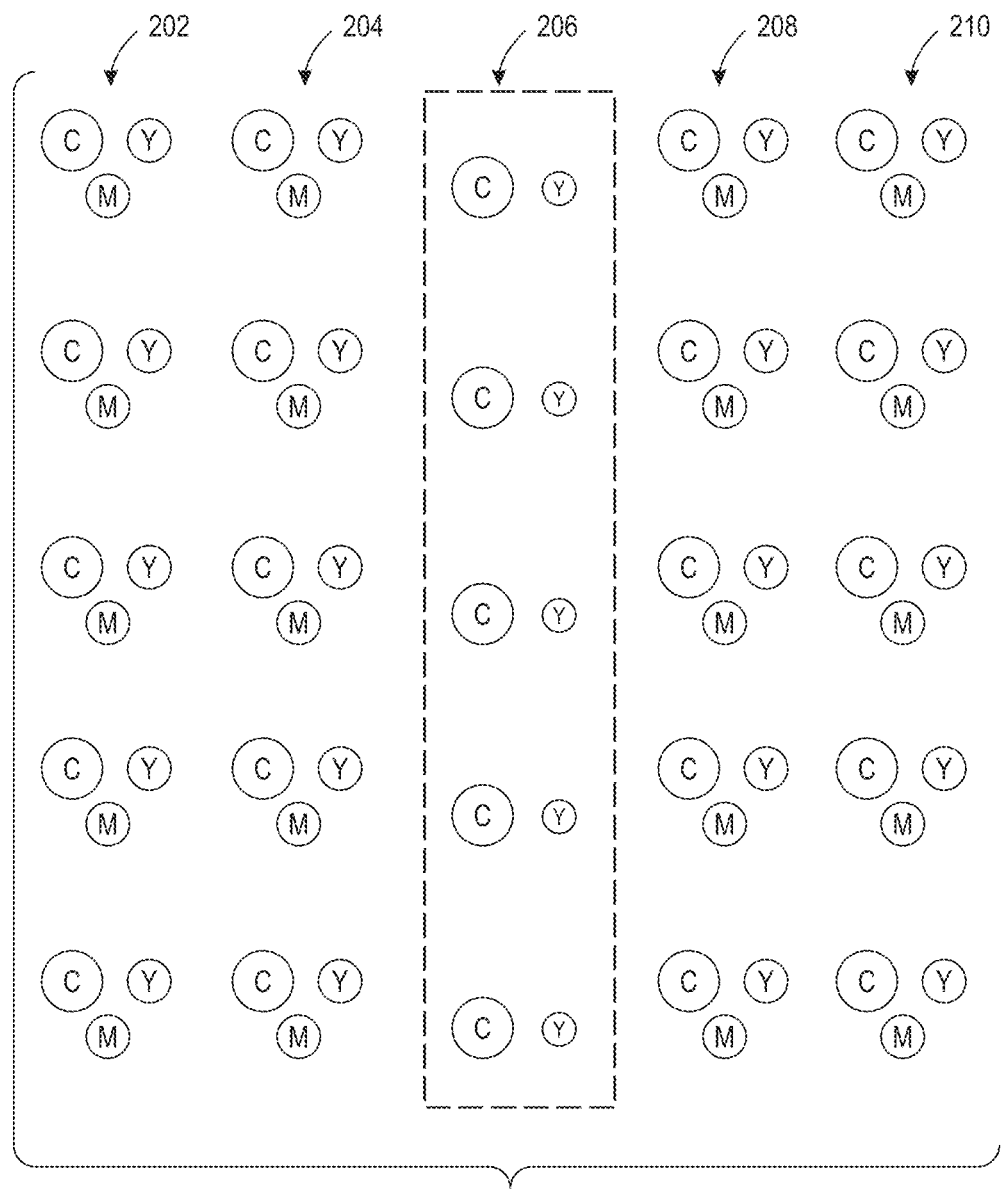

FIG. 2A shows an example pattern of ink dots from a print device 106 having a malfunctioning magenta inkjet. As shown, the malfunctioning inkjet is associated with column 206. The ink dots of column 206 lack a magenta component. Immediately adjacent columns 204 and 208 are associated with functioning inkjets, as are neighboring columns 202 and 210. FIG. 2B shows the example pattern of ink dots after compensation. As shown, the level of cyan has been increased in the adjacent and other neighboring columns to compensate for the decrease in reflectance caused by the missing magenta ink drops of column 206. In some examples, the level of compensating cyan may depend on a distance from the compensating column and the malfunctioning inkjet. For example, the level of cyan compensation may be greater in adjacent columns 204 and 208 than in more distant neighboring columns 202 and 210.

FIG. 3 illustrates a flowchart 300 of an example method. At step 301, the method includes identifying a first pixel corresponding to a malfunctioning inkjet. The malfunctioning inkjet may be one of multiple inkjets of a print device 106. The pixel may be identified within an image file, or within halftone image data representing an image to be formed. For example, the image data may be the result of interpreting the contents of an image file and may further include applying a tone reduction curve to the interpreted results of the image file.

At step 302, the method includes identifying a missing color associated with the malfunctioning inkjet. In other words, identifying the color that is expected to be at least partially missing from the image due to the malfunctioning of the inkjet. In some examples, the inkjet may be one inkjet of a printhead, where the other inkjets of the same printhead are functioning properly. The method may include receiving a list of malfunctioning inkjets and associated colors, e.g., from a user or operator of a print device 106. In some examples, self-test process reveals one or more defective or malfunctioning inkjets having an associated color.

At step 303, the method includes identifying a neighboring pixel corresponding to a functioning inkjet. At step 304, the method includes identifying a replacement color to compensate the missing color, the replacement color being a different color than the missing color. In some examples, the replacement color is the color in the printer's color scheme with the most similar perceived characteristics, such as intensity or reflectance. As discussed above, magenta and cyan may be well suited as replacements for each other in CMYK printers. In some examples, the replacement color is the most available or least subscribed color in the vicinity of the first pixel. That is, a color that has similar perceived characteristics may be unavailable as a replacement color. In that case, a different replacement color may be identified that is more available, even though it may require a larger quantity to effectively replace the missing color of the first pixel. The replacement color may also be identified based on cost or other suitable criteria.

At step 305, the method includes modifying a halftone value for the neighboring pixel based on the replacement color. For example, modifying the halftone value may include determining a change in a print characteristic due to the malfunctioning inkjet and modifying the halftone value for the neighboring pixel to compensate for the change in the print characteristic. The change in the print characteristic may be a change in a perceived quality of the formed image, such as reflectance. Modifying the halftone value may include modifying the halftone value based on a distance from the first pixel to the neighboring pixel. That is, pixels closest to the first pixel may have a greater compensation level than pixels that are further from the first pixel. Modifying the halftone value may include modifying the halftone value based on a dot gain effect of the neighboring pixel. That is, the compensation level may take into the perceived effect of the replacement color, e.g., due to optical properties and/or physical properties of the printed replacement color.

As discussed above, the level of compensation may be based on a locally differential model that includes physical dot gain, optical dot gain, and empirically determined parameters related to the missing color, the replacement color and/or the substrate. Thus, the level of compensation for a particular missing color, replacement color, and substrate may be an approximately linear function of the level of missing ink for the first pixel.

At step 306, the method includes causing the functioning inkjet to eject an ink drop based on the modified halftone value for the neighboring pixel. That is, the method includes controlling an functioning inkjet associated with the neighboring pixel to eject an ink drop based on the modified halftone value. As disclosed above, in some examples, the method executes on a processor of a print device 106 that also controls functions of the print device 106, such as firing inkjets. In other examples, the method executes on a server such as file server 102 in communication with a print device 106. In some examples, modifying the halftone value includes executing a model online, e.g., during the image-forming process. In other examples, modifying the halftone value includes applying values from one or more lookup tables previously generated by a model, thus avoiding the computational cost of executing the model during the image-forming process. In some examples, a model may be used to generate parameters, such as locally applicable slopes and offsets, that can be used to modify the halftone value for the neighboring pixel without the storage cost of entire lookup tables.

Figure 4:
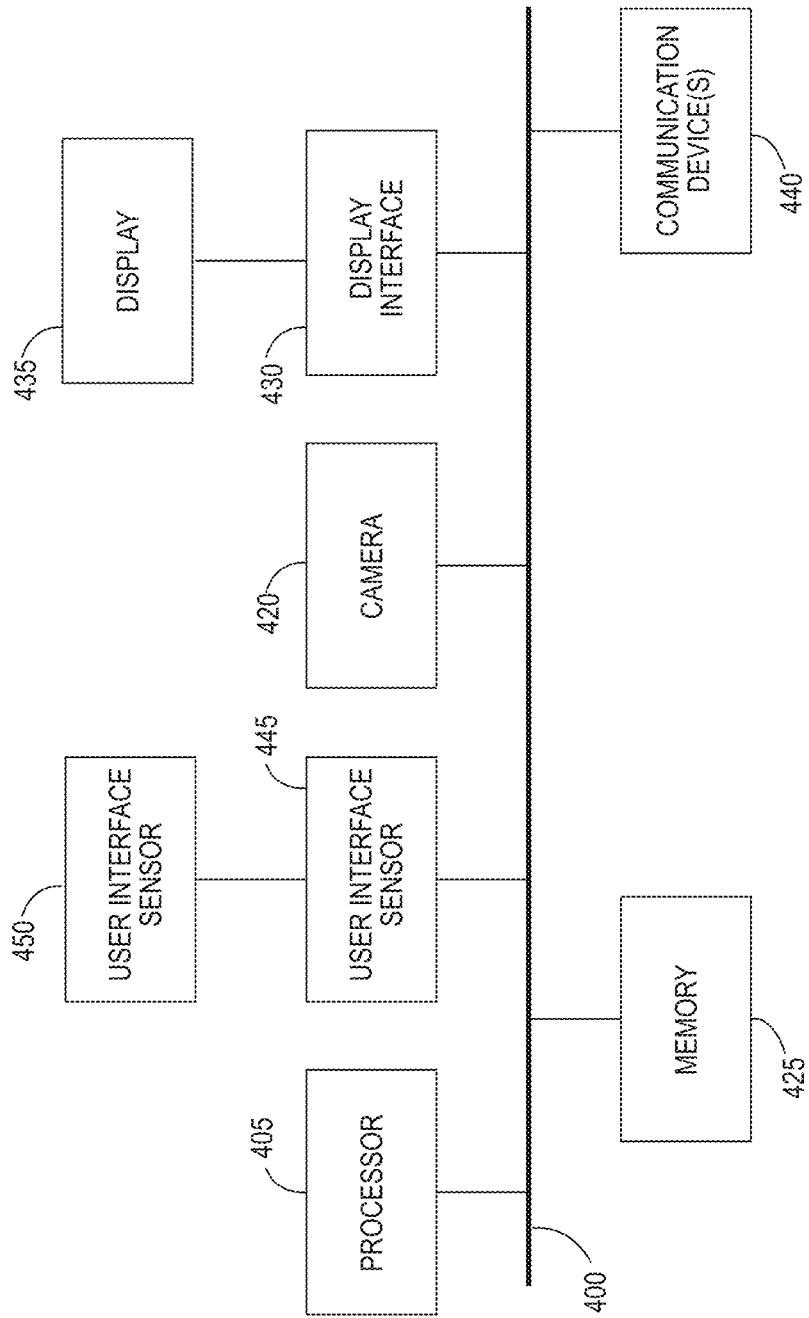
FIG. 4 depicts various embodiments of one or more electronic devices for implementing the various methods and processes described herein.

FIG. 4 depicts an example of internal hardware that may be included in any of the electronic components of the system, such as the server 102 or print device 106. An electrical bus 400 serves as an information highway interconnecting the other illustrated components of the hardware. Processor 405 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 425. A memory device may include a single device or a collection of devices across which data and/or instructions are stored.

An optional display interface 430 may permit information from the bus 400 to be displayed on a display device 435 in visual, graphic or alphanumeric format. An audio interface and audio output (such as a speaker) also may be provided. Communication with external devices may occur using various communication devices 440 such as a wireless antenna, a radio frequency identification (RFID) tag and/or short-range or near-field communication transceiver, each of which may optionally communicatively connect with other components of the device via one or more communication system. The communication device 440 may be configured to be communicatively connected to a communications network, such as the Internet, a local area network or a cellular telephone data network.

The hardware may also include a user interface sensor 445 that allows for receipt of data from input devices 450 such as a keyboard, a mouse, a joystick, a touchscreen, a touch pad, a remote control, a pointing device and/or microphone. Digital image frames also may be received from a camera 420 that can capture video and/or still images.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

In this document, a "server" refers to a system that includes one or more electronic devices that process data or execute programming applications for others who access the server from one or more remote electronic devices via a communication network, such as the Internet. A server may include infrastructure elements (such as operating systems and communication systems) that are dedicated to particular clients, or it may provide services to multiple clients with shared servers and other resources. Examples of servers include web servers, email servers, file servers, and so forth.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above-described embodiments. Rather, the scope of the present solution should be defined in accordance with the following claims and their equivalents.

What is claimed is:

1. A method for forming an image by a print device, the method comprising:
   identifying a first pixel in halftone image data, the halftone image data representing an image to be formed, the first pixel corresponding to a malfunctioning inkjet of a plurality of inkjets;
   identifying, within a region of the image around the first pixel, a neighboring pixel, the neighboring pixel corresponding to a functioning inkjet; and
   generating a modified halftone value for the neighboring pixel by:
   identifying a missing color associated with the malfunctioning inkjet,
   identifying a replacement color to compensate the missing color, the replacement color being a different color than the missing color, and modifying a halftone value for the neighboring pixel based on the replacement color; and causing the functioning inkjet to eject an ink drop based on the modified halftone value for the neighboring pixel.

2. The method of claim 1, wherein modifying the halftone value for the neighboring pixel based on the replacement color comprises:

determining an adjustment to the replacement color associated with the neighboring pixel based on the malfunctioning inkjet not printing the missing color of the first pixel; and modifying the halftone value for the neighboring pixel to include the adjustment to the replacement color.

3. The method of claim 2, wherein determining the adjustment to the replacement color associated with the neighboring pixel comprises:

determining a change in a print characteristic associated with not printing the missing color of the first pixel; and determining the adjustment to the replacement color associated with the neighboring pixel based on the determined change in the print characteristic associated with not printing the missing color.

4. The method of claim 3, wherein determining the change in the print characteristic comprises determining a change in reflectance associated with not printing the missing color of the first pixel.

5. The method of claim 3, wherein determining the change in the print characteristic comprises determining the change in the print characteristic associated with not printing the missing color of a plurality of pixels.

6. The method of claim 2, wherein determining the adjustment to the replacement color comprises determining the adjustment based on a distance from the first pixel to the neighboring pixel.

7. The method of claim 2, wherein determining the adjustment to the replacement color comprises determining the adjustment based on a dot gain effect of the neighboring pixel.

8. The method of claim 2, wherein determining the adjustment to the replacement color of the neighboring pixel comprises applying a localized differential Yule-Nielson model to characteristics of the first pixel and the neighboring pixel.

9. The method of claim 2, wherein determining the adjustment to the replacement color of the neighboring pixel comprises determining adjustments to replacement colors of each of a plurality of neighboring pixels.

10. The method of claim 1, wherein the malfunctioning inkjet is adjacent the functioning inkjet.

11. The method of claim 1, wherein the missing color is magenta and the replacement color is cyan.

12. An image-forming system comprising:

a plurality of inkjets configured to eject drops of ink onto a substrate;

a processor; and programming instructions that are configured to, when executed, cause the processor to:

identify a first pixel in halftone image data, the halftone image data representing an image to be formed, the first pixel corresponding to a malfunctioning inkjet of the plurality of inkjets;

identify, within a region of the image around the first pixel, a neighboring pixel, the neighboring pixel corresponding to a functioning inkjet;

generate a modified halftone value for the neighboring pixel by:

identifying a missing color associated with the malfunctioning inkjet, identifying a replacement color to compensate the missing color, the replacement color being a different color than the missing color, and modifying a halftone value for the neighboring pixel based on the replacement color; and cause the functioning inkjet to eject an ink drop based on the modified halftone value for the neighboring pixel.

13. The image-forming system of claim 12, wherein the programming instructions that are configured to cause the processor to modify the halftone value for the neighboring pixel based on the replacement color comprise programming instructions that are configured to cause the processor to:

determine an adjustment to the replacement color associated with the neighboring pixel based on the malfunctioning inkjet not printing the missing color of the first pixel; and modify the halftone value for the neighboring pixel to include the adjustment to the replacement color.

14. The image-forming system of claim 13, wherein the programming instructions that are configured to cause the processor to determine the adjustment to the replacement color associated with the neighboring pixel comprise programming instructions that are configured to cause the processor to:

determine a change in a print characteristic associated with not printing the missing color of the first pixel; and determine the adjustment to the replacement color associated with the neighboring pixel based on the determined change in the print characteristic associated with not printing the missing color.

15. The image-forming system of claim 14, wherein the programming instructions that are configured to cause the processor to determine the change in the print characteristic comprise programming instructions that are configured to cause the processor to determine a change in reflectance associated with not printing the missing color of the first pixel.

16. The image-forming system of claim 14, wherein the programming instructions that are configured to cause the processor to determine the change in the print characteristic comprise programming instructions that are configured to cause the processor to determine the change in the print characteristic associated with not printing the missing color of a plurality of pixels.

17. The image-forming system of claim 13, wherein the programming instructions that are configured to cause the processor to determine the adjustment to the replacement color comprise programming instructions that are configured to cause the processor to determine the adjustment based on a distance from the first pixel to the neighboring pixel.

18. The image-forming system of claim 13, wherein the programming instructions that are configured to cause the processor to determine the adjustment to the replacement color comprise programming instructions that are configured to cause the processor to determine the adjustment based on a dot gain effect of the neighboring pixel.

19. The image-forming system of claim 13, wherein the programming instructions that are configured to cause the processor to determine the adjustment to the replacement color of the neighboring pixel comprise programming instructions that are configured to cause the processor to apply a localized differential Yule-Nielson model to characteristics of the first pixel and the neighboring pixel.

20. The image-forming system of claim 13, wherein the programming instructions that are configured to cause the processor to determine the adjustment to the replacement color of the neighboring pixel comprise programming instructions that are configured to cause the processor to determine adjustments to replacement colors of each of a plurality of neighboring pixels.

\* \* \* \* \*